Aug. 15, 1944.  N. E. TOURJEE, JR  2,356,103
DISTRIBUTING APPARATUS
Filed April 20, 1943

INVENTOR
NEILSON E. TOURJEE JR.
BY
Horace B. Van Valkenburgh
ATTORNEY

Patented Aug. 15, 1944

2,356,103

UNITED STATES PATENT OFFICE 2,356,103

DISTRIBUTING APPARATUS

Neilson E. Tourjee, Jr., Morristown, N. J., assignor to Elastic Stop Nut Corporation of America, a corporation of New Jersey Application April 20, 1943, Serial No. 483,815

2 Claims. (Cl. 10—170)

This invention relates to apparatus for distributing to one or more points, and in succession, a plurality of articles—and more particularly asymmetrical articles.

An example of a symmetrical article is a standard hex nut or blank therefor, wherein each end of the article is substantially identical. The bore of a standard hex nut is countersunk an equal distance at each end, and both ends may be countersunk simultaneously. Thus, it is immaterial whether one or the other end of the nut is uppermost when the nut is fed to a countersinker, or to a tapper. However asymmetrical articles present a considerably different problem.

An example of an asymmetrical article is a type of lock nut used extensively in aircraft and other industries, wherein a well is provided adjacent one end of a threaded bore, and the sides of the well are closed over onto a locking washer or insert, which is formed of fiber or the like. The fiber insures that the bolt and nut threads will stay in frictional engagement, and thus prevents the nut from loosening, even during severe vibration. This lock nut is countersunk at only one end—opposite the washer well—and blanks for such nuts must be fed to a countersinker in one position only. Also, because the washer well causes the point at which tapping will begin and end to differ considerably in height, when the nut blank is tapped from one end as compared with the opposite end, it is necessary that each blank be fed to a tapper in the same relative position. Consequently, the devices used for feeding or distributing symmetrical articles, such as standard nut blanks, to tappers, countersinkers, and the like, are not suitable for use with asymmetrical articles, such as the lock nut described above.

A rotating cylindrical hopper, provided with slots or openings which correspond to the smaller end of the article—and which is mounted on a bed inclined at an angle, such as 45°, to the horizontal—is useful in distributing asymmetrical articles to one or more inclined chutes, which carry the articles to a countersinker, tapper, or the like. As the articles are tumbled about in the hopper while the hopper rotates in, say, a clockwise direction, those articles which enter the slots slide through into a passage which carries a supply of articles arranged in the desired position. Feed chutes lead from the lower end of this passage or space, which extends along the "up" side of the hopper, in the direction of rotation. However, there is a considerable tendency for the articles to form jams which prevent the free flow of articles down the chute or chutes, which tendency is particularly pronounced when two or more chutes are supplied by a single hopper. When a jam occurs, the supply of articles to the countersinker, tapper, or the like will soon be shut off, unless the operator notices and clears the jam, but more often than not, the machine must be stopped to clear the jam. Thus, such jams tend to interfere seriously with production, and in instances take sufficient of an operator's time, so that the number of machines one operator can handle is seriously reduced, even though the machines are substantially completely automatic.

A primary object of this invention is to provide means for preventing and breaking up nut jams occurring immediately outside a selective hopper of the above type.

Further objects of this invention include the provision of an improved apparatus for distributing nuts and the like to a machine in which a tool operation, such as tapping, countersinking, or the like, is performed; the provision of such apparatus which includes a selective hopper and means for agitating the articles to prevent jams in the passageway immediately outside the hopper; to provide such apparatus which will operate substantially automatically to clear jams as they occur; and the provision of such apparatus which is relatively simple in construction and readily adaptable to different feed chutes and hopper arrangements.

Other objects and novel features of this invention will become apparent from the following description and accompanying drawing, in which.

Figure 1:
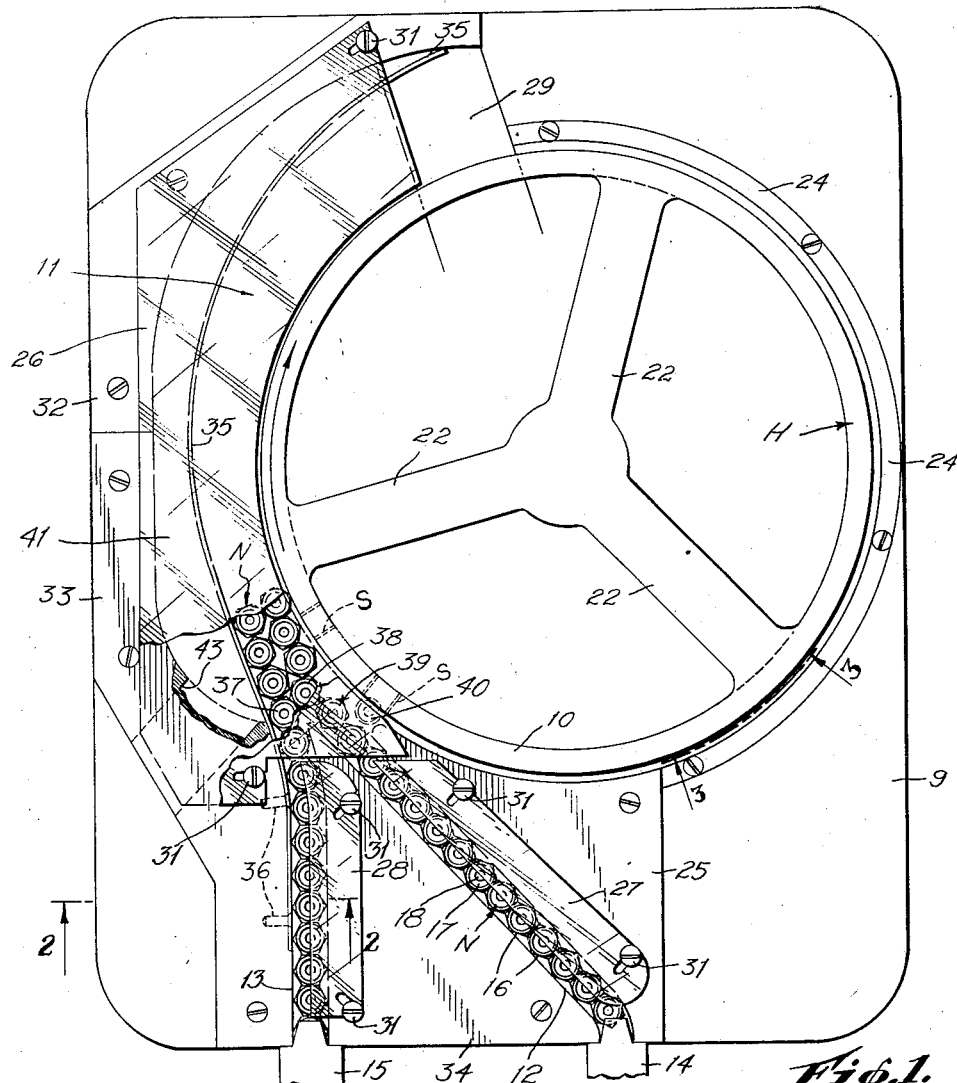
Fig. 1 is a plan view of a selective hopper and feed chute assembly, comprising an embodiment of this invention.

An embodiment of this invention, as illustrated in the drawing, includes a hopper H, rotatable in the direction of the arrow of Fig. 1 and mounted on a base 9 which may be disposed at a suitable angle to the horizontal, such as 45°. Asymmetrical nut blanks N pass through and beneath open-ended gates or slots S in the bottom of a rim 10 of the hopper, and into a space or passage 11, beginning at a point near the lower end of the hopper. The passage 11 extends in the direction of rotation of the hopper to a point adjacent the upper end of the hopper, and holds a supply of nut blanks for a pair of channels 12 and 13, leading to chutes 14 and 15, respectively. Chutes 14 and 15, in turn, may lead to mechanism for countersinking the lower end of the bore, or for tapping the bore of the nut blank.

When base 9 is inclined at an angle, for instance, of substantially 45°, the nut blanks tend to collect in the lower half of the hopper, being carried upwardly along the left side of the hopper as it rotates in a clockwise direction, as shown.

Also, the blanks slide by gravity through channels 12 and 13 into chutes 14 and 15, which are also inclined at a shiftable angle for gravity flow.

Figure 2:
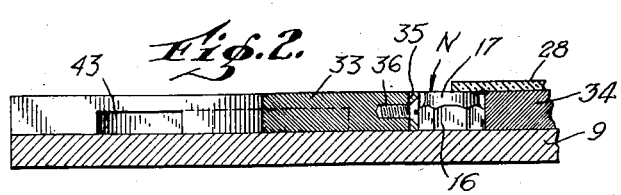
Fig. 2 is a cross-section of a portion of the feed chute and hopper base, on an enlarged scale, taken along line 2—2 of Fig. 1.
Figure 3:
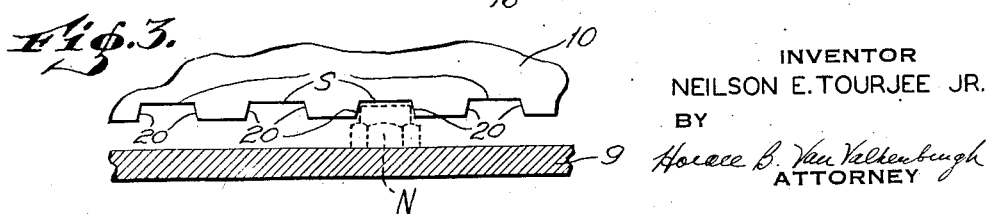
Fig. 3 is a section taken along arcuate line 3—3 of Fig. 1, also on an enlarged scale, showing the shape of the nut outlets or gates.

Each nut blank N, as in Figs. 1 and 2, comprises a lower hexagonal portion 16, and, at one end thereof, a washer well 17, the sides of which are crimped over onto a locking washer formed of fiber or the like. Bore 18 of hexagonal portion 16 is adapted to be threaded, and the bottom of the bore is countersunk. For reasons pointed out previously, it is necessary that each successive blank be fed in the same position to a machine such as a countersinker, tapper, or the like.

So that the blanks will emerge from the hopper with the washer well uppermost, the distance between rim 10 of the hopper and base 9 is slightly greater than the height of hexagonal lower portion 16 of the nut blank. Each slot S has sloping sides 20, and at the bottom is approximately the width of hexagonal portion 16 of the nut blank, but at the top is only slightly wider than the top of the washer well 17. Since only the washer well 17 can pass through a slot, the nut blank can emerge in only one position— i. e. with the washer well uppermost. There may be instances when it is desirable that rim 10 extend almost to plate 9, and slots S conform substantially to the entire cross-sectional shape of the articles to be distributed.

For supporting the cylindrical rim 10, hopper H is provided with a plurality of radially extending arms 22, while the rim has sufficient height so that a desired quantity of nuts can be placed in the hopper at one time.

As the nut blanks tumble about in hopper H, due to rotation thereof—and, if desired, the additional agitation and stirring provided by scoops or plates attached to the inside of rim 10—each nut which is in the correct position to slip into one of the slots S tends to be pushed through the slot by the weight of the tumbling mass of nuts inside the hopper. If the nut tends to emerge from the slot around the periphery of a rim 24 or a block 25, for instance, it will be carried along until passage 11 at the end of block 25 is reached. Each nut blank which emerges into passage 11 from a slot makes room for the next nut seeking entrance therein from the inside of the hopper, and passage 11 theoretically may hold sufficient nut blanks to assure a substantially continuous supply for chutes 14 and 15.

Passage 11 and channels 12 and 13 are provided with cover plates 26, 27, and 28, respectively, since the angle of base 9 is such that the nut blanks otherwise tend to fall out. The cover plates may be made of transparent material such as plastic, if desired, and are so shown to permit clarity of illustration of parts beneath. Cover plates 27 and 28 do not extend completely over channels 12 and 13, thus permitting access to the nut blanks by a suitable instrument, such as a small hook, should the operator so desire.

Cover plate 26 extends to the hopper, and covers substantially the entire passage 11, up to a pocket 29, which leads from the upper end of space 11 to the inside of the hopper, to feed back into the hopper nut blanks that are carried around. Cover plate 27 may be secured to block 25 by wing nuts 31, while cover plates 26 and 28 may be similarly secured to blocks 32, 33, and 34, respectively. Blocks 33 and 34 are adapted to form between their sides channel 13, while blocks 25 and 34 similarly form channel 12. Blocks 25, 32, 33, and 34 may be secured to base 9 in any suitable manner, as by bolts or screws.

In accordance with this invention, resilient means, such as a leaf spring 35, is provided to form the outer wall of passage 11. Leaf spring 35 extends around the hopper to a point adjacent the upper end of passage 11, and is affixed at its lower end to block 33 in the wall of channel 11 in a suitable manner, as by machine screws 36, as shown. It will be understood that the channels 12 and 13 may be considered as a continuation of passage 11, and that the lower end of the spring may form all or a portion of the wall of channel 13.

Although it appears that there should be no difficulty in operation of a selective hopper as just described, it has been found by experience that the nut blanks tend to jam or pack at the entrance to channels 12 and 13. For instance, nut blanks 37, 38, and 39, along with nut blank 40—when nut blank 40 is pushed outwardly to contact nut blank 39—will tend to jam and bridge the entrance to the channels. Leaf spring 35 apparently produces an agitating motion on the nut blanks as they come from the hopper, thus clearing jams. As the blanks push against the leaf spring, the spring gives slightly but resists the thrust. As more blanks are crowded into passage 11, the spring is pushed back to a greater extent, thus permitting the blanks to move somewhat and clear. In addition, the blanks are continuously agitated from left to right and vice versa, by the impelling motion from the hopper and the resistance and return thrust of the spring. A space 41 between the spring and blocks 32 and 33 provides freedom of movement of the spring. In addition, the upper end of the spring is free to slide along the wall of block 32, thus providing further freedom of movement.

An outlet for dirt, chips, or the like, which might interfere with the desired movement of the spring, is provided by an angular slot 43 in the mid-section of block 33. Of course, the upper half of block 33 may be omitted, as well as the greater part of block 32, as these blocks previously formed the outer wall of passage 11. Also, different forms of resilient means may be used, spring 35 may comprise a double spring, one branch of which extends to the top of space 11 and the other branch of which bends back to contact block 32 just above block 33, or its end may be fixed at that point. Other resilient means will suggest themselves to those skilled in the art.

It will be evident from the foregoing that the relative freedom of movement of the leaf spring, and its continuous resistance and return of thrusts by nut blanks passing from the selective hopper H, result in a relatively even distribution of the nuts to the feed chutes. Thus, the jams adjacent the entrance of channels 12 and 13, otherwise of frequent occurrence, rarely occur in the case of apparatus constructed in accordance with this invention.

Although an embodiment of this invention has been illustrated and described as distributing nut blanks through a pair of feed chutes, it will be understood that only one, or any number of, chutes, may be utilized. Also, it will be understood that the apparatus of this invention is useful in distributing articles other than nuts to machines or the like, and is further useful in distributing symmetrical articles, such as blanks for standard hex nuts.

It will be further understood that the principles of this invention may be applied in various ways; and that apparatus constructed in accordance with this invention need not take the form illustrated and described, but the invention may be embodied in numerous different forms and in many different ways, all without departing from the spirit and scope of this invention, as defined in the appended claims.

What is claimed is:

1. Apparatus for distributing nuts or the like, comprising a base disposed at an angle to the horizontal; a rotatable selective hopper mounted on said base, said hopper being provided about its bottom periphery with a plurality of open-ended slots conforming in shape to at least a portion of the cross-section of the articles to be distributed; a passage extending around a portion of said hopper, from a point adjacent the lower end and up alongside said hopper, in a direction corresponding to the direction of rotation of said hopper; a cover for said passage; resilient means forming the lateral wall of said passage opposite said hopper; blocks attached to said base and defining a channel leading from the lower end of said passage, one of said blocks extending in spaced relation to said hopper to provide a support for said passage cover; and an inclined slot in said block for leading chips or the like from behind said resilient means.

2. Apparatus as defined in claim 1, wherein said resilient means comprises a leaf spring.

NEILSON E. TOURJEE, Jr.